(12) United States Patent
Klegraf et al.

(10) Patent No.: US 8,088,351 B2
(45) Date of Patent: Jan. 3, 2012

(54) PROCESS FOR THE PREPARATION OF ETHANEDINITRILE

(75) Inventors: Ellen Klegraf, Brig-Glis (CH); Thomas Grützner, Brig (CH); Jan Keller, Visp (CH)

(73) Assignee: Lonza Ltd., Basel (CH)

( * ) Notice: Subject to any disclaimer, the term of this patent is extended or adjusted under 35 U.S.C. 154(b) by 0 days.

(21) Appl. No.: 13/061,751

(22) PCT Filed: Nov. 9, 2009

(86) PCT No.: PCT/EP2009/007992
§ 371 (c)(1),
(2), (4) Date: Mar. 2, 2011

(87) PCT Pub. No.: WO2010/052017
PCT Pub. Date: May 14, 2010

(65) Prior Publication Data
US 2011/0171102 A1    Jul. 14, 2011

Related U.S. Application Data

(60) Provisional application No. 61/112,874, filed on Nov. 10, 2008.

(30) Foreign Application Priority Data

Nov. 10, 2008    (EP) ..................................... 08019609

(51) Int. Cl.
*C01C 3/00* (2006.01)
(52) U.S. Cl. ........................................................ 423/384
(58) Field of Classification Search .................. None
See application file for complete search history.

(56) References Cited

U.S. PATENT DOCUMENTS

| | | |
|---|---|---|
| 2,712,493 A | 7/1955 | Moje |
| 3,031,265 A | 4/1962 | Zima |
| 3,135,582 A | 6/1964 | Geerts et al. |
| 3,494,734 A | 2/1970 | Nakamura |
| 3,544,268 A | 12/1970 | Hess |
| 3,769,388 A | 10/1973 | Olivier |
| 3,949,061 A | 4/1976 | Yamashita et al. |
| 3,997,653 A * | 12/1976 | Riemenschneider et al. 423/384 |
| 4,073,862 A | 2/1978 | Haese |
| 6,001,383 A | 12/1999 | O'Brien et al. |

FOREIGN PATENT DOCUMENTS
WO    2005037332 A1    4/2005

OTHER PUBLICATIONS

Riemenschneider et al., "Cyanogen or Oxaminde from HCN in One Step", Chemtech, pp. 658-661; 1976.

* cited by examiner

*Primary Examiner* — Steven Bos
*Assistant Examiner* — Justin Bova
(74) *Attorney, Agent, or Firm* — Hoffmann & Baron, LLP

(57) ABSTRACT

The invention relates to a process for the preparation of ethanedinitrile, by reading hydrocyanic acid in the liquid phase with nitric acid in the presence of a cupric ion catalyst.

15 Claims, 2 Drawing Sheets

PROCESS FOR THE PREPARATION OF ETHANEDINITRILE

This application is the U.S. National Phase of, and Applicants claim priority from, International Patent Application Number PCT/EP2009/007992 filed 9 Nov. 2009, European Patent Application bearing Serial Number 08019609.0 filed 10 Nov. 2008 and U.S. Provisional Patent Application No. 61/112,874 filed 10 Nov. 2008, which are incorporated herein by reference in their entirety.

BACKGROUND OF THE INVENTION

The invention relates to a process for the preparation of ethanedinitrile from hydrocyanic acid.

Ethanedinitrile (cyanogen, $(CN)_2$) is a stable, colorless gas which was first prepared in the laboratory in 1815 by thermal decomposition of silver cyanide. Due to its reactivity ethanedinitrile is a promising building block for the synthesis of organic compounds as reviewed by Roesky and Hofmann in *Chemiker Zeitung* 1984, 7-8, 231-238. It is also useful as a fumigating agent as shown in U.S. Pat. No. 6,001,383 and WO2005/037332. Furthermore, ethanedinitrile shows promise as an active ingredient in rocket propellant systems.

In known processes ethanedinitrile is formed from hydrocyanic acid in the presence of oxygen, nitrates and a copper catalyst.

In U.S. Pat. No. 3,135,582 there is disclosed the preparation of ethanedinitrile by reacting oxygen and a nitrogen oxide with hydrocyanic acid in the presence of a catalyst at a temperature from 100 to 1000° C.

In U.S. Pat. No. 3,949,061 there is disclosed the preparation of ethanedinitrile by reacting hydrocyanic acid in an aqueous solution in the presence of elemental oxygen, copper nitrate.

In U.S. Pat. No. 3,769,388 there is disclosed oxidizing hydrocyanic acid in the presence of oxygen, a substantially anhydrous liquid medium, a catalytic amount of silver, ruthenium or mercury and a nitrate.

In U.S. Pat. No. 3,494,734 there is disclosed reacting hydrocyanic acid with nitrogen dioxide in the presence of cupric ion as a catalyst.

In DE 1163302 A there is disclosed the oxidation of hydrocyanic acid in the presence of cupric salts in strongly acidic solutions, whereas in the examples and the specification the oxidation is carried out at about pH 2.8. According to the examples the reaction is carried out in the presence of an ammonium salt and elemental oxygen as well as an additional reagent to activate the elemental oxygen.

Riemenschneider, W. discloses in *Chemtech* 1976, 658-661 that it is advisable to use a slight excess of oxygen in the reaction of nitrogen dioxide with hydrocyanic acid.

Until today the available processes for the preparation are not satisfactory regarding yield and selectivity. Also, the recovery of ethanedinitrile from the effluent gas is difficult, particularly in the presence of excess nitrogen dioxide.

SUMMARY OF THE INVENTION

The technical problem to be solved was to provide an alternative method for the preparation of ethanedinitrile.

The problem has been solved by the process of claim 1.

Claimed is a process for the preparation of ethanedinitrile $((CN)_2)$ from hydrocyanic acid (HCN) in liquid phase, by catalytic oxidation of hydrocyanic acid in the presence of a cupric ion catalyst and an aprotic polar solvent, characterized in that nitric acid ($HNO_3$) is added as sole oxidant during the oxidation of hydrocyanic acid. Thus, neither NO, $NO_2$ nor $N_2O_4$ is directly added to the reaction mixture.

During the reaction a colorless gas mainly comprising ethanedinitrile, NO and water evolves from the reaction mixture upon contacting of hydrocyanic acid and nitric acid. Said colorless gas is visibly free of $N_xO_y$, wherein y is 2x (for example $NO_2$ or $N_2O_4$). The ethanedinitril can be easily separated both from NO and water. NO can be recycled to the process after re-oxidation to nitric acid. Surprisingly, the NO comprising in the effluent gas does not further react in the effluent gas and can be separated easily from the product. Minimizing the amount of $N_xO_y$, wherein y is 2x (for example $NO_2$ or $N_2O_4$) in the primary product circuit reduces the potential of ecological hazards.

Equation (I) depicts the stoichiometry of the present process:

$$6HCN + 2NO_3 \rightarrow 3(CN)_2 + 2NO + 4H_2O \qquad (I)$$

According to equation I, two moles of nitric acid are consumed in the process reacting to six moles of hydrocyanic acid to obtain three moles of ethanedinitrile, two moles of nitric oxide and four moles of water. However, the obtained nitric oxide can be re-oxidized with elemental oxygen and reacted with water to nitric acid, at least theoretically, in a continuously operated process wherein only the starting amount of nitric acid is required.

In a preferred embodiment in the process nitric acid and hydrocyanic acid are added simultaneously with a molar ratio in the range from 1:2.5 to 1:3.5.

In the present process nitric acid means "concentrated" nitric acid comprising at least 40 wt %, preferably at least 60 wt %, more preferably about 65 wt % of $HNO_3$. Nitric acid of higher concentration, up to fuming nitric acid (~100 wt % $HNO_3$), can also be used in the process. A further aspect of the present invention is the recycling of the oxidizing agent in a closed circuit as depicted for example in FIGS. 1 and 2. Nitric oxide (NO) obtained in the process can be oxidized with oxygen to nitrogen dioxide ($NO_2$ or $N_2O_4$), which can be reacted with water to give nitric acid having a maximum concentration of about 65 wt %.

In a preferred embodiment said nitric acid can be directly reused in the process, thus minimizing the need for storage and transport of nitric acid.

Nitric acid is consumed stoichiometrically in the process. Thus, when nitric acid and hydrocyanic acid are fed simultaneously in a more or less stoichiometric ratio there will be no or only a small excess of nitric acid present in the process. Thus the reaction can be handled very safe. After separation from the product NO is re-oxidized in a separate circuit to recycle the nitric acid used in the process. Using the recycled nitric acid only a small initial amount of nitric acid is required in the process.

In a preferred embodiment the reaction is carried out essentially in the absence of elemental oxygen. Using nitric acid instead of nitrogen dioxide as oxidant allows the absence of elemental oxygen in the reaction mixture, thus, avoiding the presence and formation of nitrogen dioxide which is difficult to separate from the gaseous product gas mixture, comprising ethanedinitrile and nitric oxide. When carrying out the reaction in the absence of elemental oxygen, the formation of nitrogen dioxide and the corresponding dimer could not be determined. Also, the gaseous product mixture was completely colorless. Another advantage of using nitric acid is that also the formation of carbon dioxide and other gases which have to be removed from the process is reduced.

In a preferred embodiment water is present in the reaction mixture is ≦20 wt % of the liquid phase, more preferably in the range from 0.1 to 20 wt %, particularly preferred from 0.5 to 10 wt %.

According to FIGS. 1 and 2 the process can be operated batch wise or in a continuous way, wherein part of the reaction mixture is withdrawn and water is removed before the water-depleted mixture, optionally after addition of make-up solvent and copper catalyst, is recycled to the reactor.

Suitable aprotic polar solvents can be selected from the group consisting of nitriles, ethers, glycol ethers and glycol ether esters, nitro compounds, sulfones, esters, amides, thioamides and polar aromatic heterocyclic compounds.

It is not necessary that the solvent be stable against nitric acid for a long period of time, because there is only a small excess of nitric acid present in the process.

Preferably nitriles are selected from the group consisting of acetonitrile, propionitrile, benzonitrile, butyronitrile, valeronitrile, phenylacetonitrile and p-tolunitrile.

Preferred esters are selected from the group consisting of methyl propanoate, ethyl propanoate, ethyl acetate, propyl acetate, butyl acetate, dimethyl carbonate, diethyl carbonate, ethyl trichloroacetate, ethyl chloroacetate, methyl acetate, isopentyl acetate, methyl benzoate, ethyl benzoate, diethyl malonate, ethyl acetoacetate, dimethyl phthalate, butyrolactone, propylene carbonate, ethylene carbonate and dibutyl phthalate.

Preferred glycol ethers and glycol ether esters are selected from the group consisting of ethylene glycol dimethyl ether, ethylene glycol diethyl ether, ethylene glycol dipropyl ether, ethylene glycol dibutyl ether, 1,2-propylene glycol dimethyl ether, 1,2-propylene glycol methyl ethyl ether, 1,2-propylene glycol diethyl ether, 1,2-propylene glycol dipropyl ether, 1,2-propylene glycol methyl butyl ether, 1,3-propylene glycol dimethyl ether, 1,2-butylene glycol dimethyl ether, glycerol trimethyl ether, glycerol triethyl ether, glycerol tripropyl ether, glycerol dimethyl ether, diethylene glycol dimethyl ether, diethylene glycol diethyl ether, dipropylene glycol dimethyl ether, triethylene glycol dimethyl ether and propylene glycol monomethyl ether acetate.

Preferred the nitro compound is selected from the group consisting of 2-nitropropane, 1-nitropropane, nitroethane, nitromethane and nitrobenzene.

A suitable sulfone is for example sulfolane.

Preferred the ether is selected from the group consisting of 1,4-dioxane, tert-butyl methyl ether, di-isopentyl ether, furan, tetrahydrofuran, 2-methyltetrahydrofuran, anisole, tetrahydropyran, phenetole, 1,3-dioxolane, di-n-propyl ether, diisopropyl ether, di-n-butyl ether, di-tert-butyl ether, diphenyl ether and dibenzyl ether.

Preferred the amide is selected from the group consisting of N,N-dimethylformamide, N,N-diethylformamide, tetramethylurea, tetraethylurea, N,N-dimethylacetamide, N,N-diethylacetamide, N-methylacetamide, N-methylformamide, formamide, 2-pyrrolidinone and 1-methyl-2-pyrrolidinone.

Preferred the polar aromatic heterocyclic compound is selected from the group consisting of pyridine, methylethyl pyridine, 2,3-dimethylpyrimidin-1-one, 1,3-dimethylpyrimidin-2-one and lutidines (2,3-, 2,4-, 2,5-, 2,6-, 3,4- or 3,5-dimethylpyridine).

A preferred thioamide is for example 1-methylpyrrolidine-2-thione.

In the present process the copper catalyst comprises cupric ions.

In the presence of nitric acid nearly any copper alloy, copper complex and copper salt will be oxidized to provide the cupric ions.

Thus, said cupric ions are generated from metallic copper or a copper alloy, from a copper(0) complex, a copper(I) salt or a copper(I) complex, a copper(II) salt or a copper(II) complex, and mixtures thereof.

The term "copper(0)" comprises metallic copper and copper alloys, even more preferably in finely divided form, for example ground metal or alloy. The term "copper(0) compounds" comprises metal complexes including formally uncharged copper atoms.

The term "copper(I) compounds" comprises copper(I) salts and metal complexes including $Cu^+$ ions.

Suitable copper(I) salts are selected from Cu(I) acetate, Cu(I) bromide, Cu(I) chloride, Cu(I) iodide, Cu(I) oxide and Cu(I) cyanide.

The term "copper(II) compounds" comprises copper(II) salts and metal complexes including cupric ions ($Cu^{2+}$).

Preferably a copper(II) salt which can be dissolved at least one of the solvents mentioned above is used in the present process. Suitable copper(II) salts are for example copper(II) nitrate, copper(II) chloride, copper(II) bromide, copper(II) iodide, copper(II) sulfate, copper(II) cyanide, copper(II) oxide, copper(II) pyrophosphate, copper(II) sulfide, copper (II) hydroxyphosphate, copper(II) carbonate, copper(II) hydroxide and copper(II) salts of non-aromatic and aromatic carboxylic acids such as copper(II) acetate, copper(II) formate, copper(II) acetylacetonate, copper(II) tartrate, copper (II) oxalate, copper(II) citrate, copper(II) benzoate, copper (II) methylacetoacetate, copper(II) ethylacetoacetate, copper (II) ethylbenzoylacetate, copper(II) trifluoromethanesulfonate, copper(II) phthalate or copper(II) toluenesulfonate.

In one preferred embodiment hydrocyanic acid is placed in the reaction vessel while nitric acid is fed to the mixture.

More advantageously, only the catalyst, optionally dissolved in or mixed with the solvent, is placed in the reaction vessel and nitric acid and hydrocyanic acid are added simultaneously, discontinuously or continuously, to the reaction mixture while the reaction proceeds.

If hydrocyanic acid and nitric acid are fed simultaneously or in alternating portions it is not necessary to feed them in a stoichiometric manner at the same time. Nevertheless, to avoid over-oxidation and side reactions with the solvent it is recommended to have hydrocyanic acid and nitric acid in the reactor more or less according to the stoichiometric ratio of equation I. In order to avoid incomplete conversion of hydrocyanic acid, nitric acid may also be fed in a slight excess without detrimental effect.

The process can be carried out at a temperature in the range from 15 to 150° C., preferably from 50 to 100° C., more preferably from 60 to 90° C.

Performing the process at high pressure may result in problems of obtaining the product in gaseous form, thus the product would have to be recovered from the liquid reaction mixture. In the presence of nitric acid ethanedinitrile reacts more or less rapidly with water formed in the reaction. Thus, the liquid reaction temperature and pressure should be in a range that allows to easily remove the product in gaseous form from the reactor. Most preferably the reaction is carried out at approximately atmospheric pressure.

After mixing hydrocyanic acid and nitric acid a product gas stream comprising ethanedinitrile and nitric oxide is formed immediately. Advantageously, said product gas stream is continuously discharged from the reactor and subjected to further work-up, wherein ethanedinitrile is separated from the product gas stream.

It is possible to separate ethanedinitrile from the product gas stream in different ways, for example by freezing, condensation, absorption/desorption or adsorption/desorption of ethanedinitrile.

Particularly preferably, the ethanedinitrile in the product gas stream is absorbed in a solvent and recovered from said solvent.

To minimize waste disposal, costs, the amount of nitric acid used and environmental hazards, the present process provides the possibility to recycle the nitric oxide obtained in the reaction of hydrocyanic acid and nitric acid. Advantageously, on industrial scale the effluent nitric oxide (NO) is oxidized to obtain nitrogen dioxide ($NO_2$). Oxidation of NO in the presence of elemental oxygen ($O_2$) is well known in the art. Feeding said $NO_2$ obtainable from exhaust NO to water results in an aqueous nitric acid ($HNO_3$) solution which can directly be used in the process. Reacting $NO_2$ with water is also known in the art. Recycling of the exhaust NO of the process thus can minimize the feed of $HNO_3$ once the process has been started.

Thus, in a preferred embodiment the nitric oxide of the product gas stream is fed to a separate reactor where it is oxidized with an oxygen containing gas to obtain nitrogen dioxide, which is absorbed in water, and the obtained nitric acid is recycled to the reaction with hydrocyanic acid.

One preferred embodiment of the reaction is to carry out the reaction in a continuous process, wherein, within the process, only feeds of hydrocyanic acid, elemental oxygen and make-up streams are required. Expediently, said recycle-process requires an efficient recycling of solvent and catalyst in a suitable purity and at high yields. Suitable, preferably high, purity of each recovered component is preferred because enrichment of by-products and/or decomposition products can have a detrimental effect to the life time of the process. Using a high boiling solvent in the reaction of nitric acid with hydrocyanic acid has the advantage that separation of cyanogen from the reaction mixture can be carried out easily.

In a preferred embodiment the present process is carried out as a continuous process, optionally wherein at least the organic solvent and catalyst is recovered.

The reaction of nitric acid with hydrocyanic acid is expediently carried out in an organic solvent which is essentially the same as the solvent used for work-up of ethanedinitrile.

In a preferred embodiment the work-up of ethanedinitrile is carried out using a solvent to recover ethanedinitrile from the product gas stream mixture. Preferably said solvent, at temperatures of about +30° C. or lower has either has good absorption properties for ethanedinitrile and poor absorption properties for nitric oxide.

At a temperature from −5 to +30° C. acetonitrile solubilizes ethanedinitrile much better than nitric oxygen and thus can be used to effectively separate both compounds.

Thus, in a more preferred embodiment the organic solvent is acetonitrile.

In a particularly preferred embodiment the reaction of nitric acid with hydrocyanic acid is carried out with acetonitrile as organic solvent and the product gas stream, optionally after passing trough a condenser, is fed to an absorber column with countercurrent flow of acetonitrile. The countercurrent acetonitrile predominantly absorbs ethanedinitrile while nitric oxide remains in gaseous form, and finally the product ethanedinitrile is recovered from acetonitrile and removed from the process, while the recovered acetonitrile is recycled to the process. Using acetonitrile for both the reaction and the recovery of ethanedinitrile from the product gas stream provides an efficient recycling of the compounds and recovery of the product at high yields In a further particularly preferred embodiment the product ethanedinitrile is recovered from acetonitrile, after being separated from nitric oxide, in a desorber column.

Optionally, the recovered nitric oxide is oxidized in the presence of an oxygen containing gas to obtain nitrogen dioxide, which is reacted with water to obtain nitric acid. Said recycled nitric acid can also be re-used in the process.

FIGS. 1 and 2 illustrate the process of the invention in a preferred embodiment, wherein the nitric acid and the organic solvent are recycled in the process (FIG. 1) and in a more detailed form specifically adopted to the use of acetonitrile as polar organic solvent (FIG. 2).

DESCRIPTION OF THE FIGURES

Figure 1:
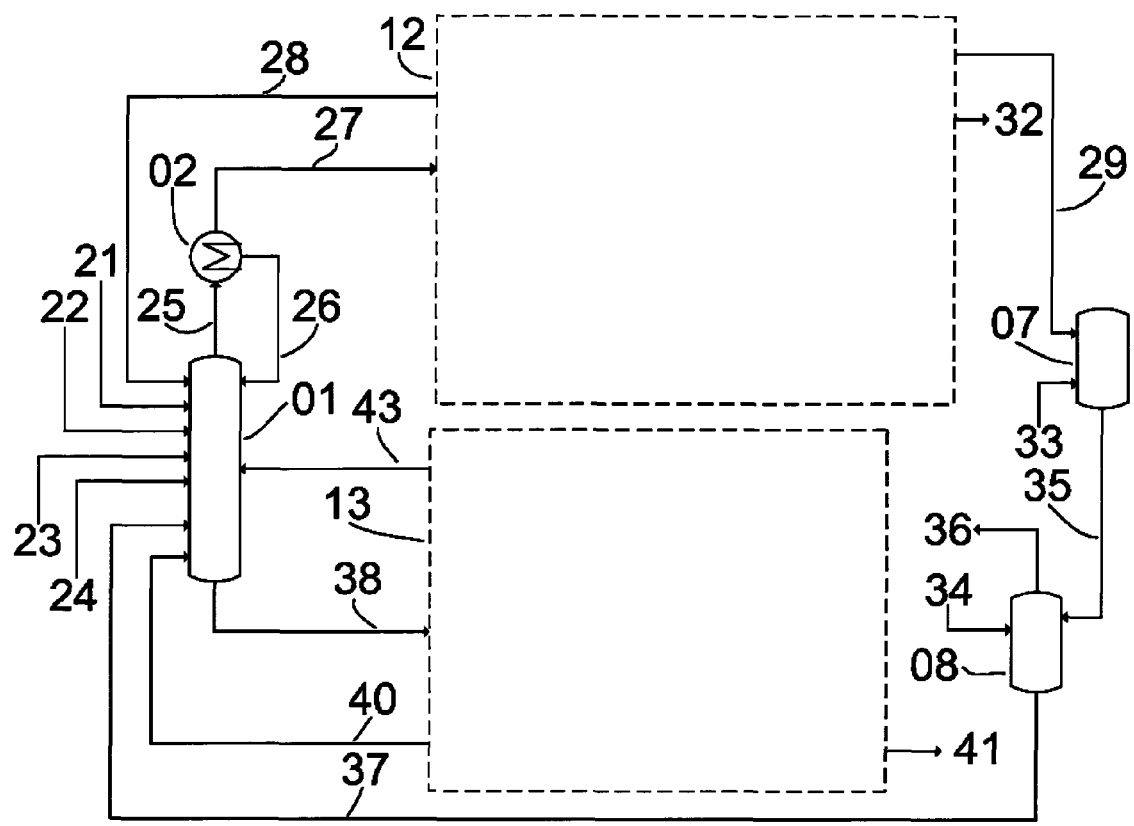
FIG. 1 illustrates a general mode of the process with nitric acid recycling.

FIG. 1 illustrates a general mode of the process with nitric acid recycling. Reactor 01 is equipped with lines 21, 22, 23 and 24 to provide the feed of hydrocyanic acid, nitric acid, catalyst and solvent, respectively. Although in a continuous process most of nitric acid, solvent and catalyst is recycled through recycle lines 37, 40 and 43, lines 22, 23 and 24 may also be used for make-up purposes during the process, while line 21 is also used to provide the required hydrocyanic acid during the reaction. Lines 33 and 34 respectively provide elemental oxygen and water to re-oxidize nitric oxide.

The product gas stream discharged in line 25 from reactor 01, comprising ethanedinitrile, nitric oxide, organic solvent and water and traces of carbon dioxide, is fed to a condenser 02, wherein most of the organic solvent and water is condensed and the condensate in line 26, optionally after partially or completely removal of water, is recycled to reactor 01. The remaining product gas stream from condenser 02 is fed in line 27 to a work-up unit 12 for isolating the ethanedinitrile. Product gas stream in line 27 comprises ethanedinitrile, nitric oxide and small amounts of inert gases such as carbon dioxide and is substantially depleted of solvent and water. Work-up unit 12 comprises (i) line 32 for gaseous product, predominantly consisting of pure ethanedinitrile, (ii) an effluent purge line 28, predominantly consisting of recovered organic solvent with traces of water, which is recharged into the reactor 01 to suppress accumulation of unwanted compounds (for example water) within the work-up unit 12, and (iii) line 29, predominantly consisting of nitric oxide and inert gases such as carbon dioxide.

The gas stream of line 29 is recharged to an oxidation reactor 07, wherein in the presence of an oxygen comprising gas, fed through line 33, nitric oxide is oxidized to nitrogen dioxide, advantageously in the presence of a catalyst. The effluent gas stream of line 35, comprising nitrogen dioxide, optionally is recycled to reactor 08, and reacted with water, fed through line 34, to obtain nitric acid. Reactor 08 comprises line 36 to remove exhaust gases such as carbon dioxide. Nitric acid is optionally charged in line 37 to reactor 01 or used elsewhere.

Work-Up Unit 12:

Depending on the thermodynamic properties of the in line 27, different separation techniques for recovering ethanedinitrile can be used. A suitable embodiment is the combination of an absorber column with a regenerating unit for the recycling of the solvent. Ethanedinitrile is absorbed in the solvent of the absorber column with high selectivity and is released in the subsequent regeneration unit, comprising desorption, distillation or rectification. A further work-up possibility is the absorption of the inert gases in a suitable solvent. Ethanedinitrile is then the head product of the first column.

Alternatively to the recovering of ethanedinitrile by absorption/regeneration, it is also possible to use for example (i) adsorption techniques, i.e. adsorption of ethanedinitrile on a solid adsorbent and subsequent desorption using a suitable solvent, or (ii) liquid-liquid-extraction techniques to separate ethanedinitrile from the other reaction partners. Necessary means to recycle the solvent in both examples are known to the skilled person.

Another alternative for recovering ethanedinitrile is to freeze ethanedinitrile directly from the gaseous product stream. This could be performed using two parallel heat exchange lines, which are alternatively perfused of the product gas stream. While ethanedinitrile is solidified in the one line, the solidified ethanedinitrile in the other line is re-vaporized and obtained in almost pure form.

In line 38 a partial amount of the reaction mixture, either in continuous or discontinuous mode, said reaction mixture comprising organic solvent, water, catalyst, dissolved ethanedinitrile and small amounts unreacted nitric acid and hydrocyanic acid, is discharged from reactor 01, and fed to solvent recovery unit 13. Within solvent recovery unit 13, the water is separated from the reaction mixture, as exemplified more detailed below, and is discharged of the process in line 41, while recovered organic solvent, catalyst and nitric acid are recycled in line 40 to reactor 01. Solvent recovery unit 13 further comprises a bypass line 43, comprising a mixture of solvent, ethanedinitrile and hydrocyanic acid, which is also recycled to the reactor.

Solvent recovery unit 13:

Depending on the thermodynamic properties of the mixture comprising organic solvent, water and catalyst the separation can be carried out for example using simple distillation or rectification for zeotropic mixtures, pressure-swing rectification or rectification with entrainment agents (for example ethers or hydrocarbons), for azeotropic mixtures in suitable column configurations which are known to the person skilled in the art. The columns can be selected from plate, bubble or bubble tray columns or columns with regular or irregular packing. Alternatively, membrane separation techniques such as evaporation, pervaporation or ultra filtration can be used to separate the reaction water. In addition to the aforementioned methods, it is also possible to use adsorption, absorption or extraction steps to separate the water from the reaction mixture.

Figure 2:
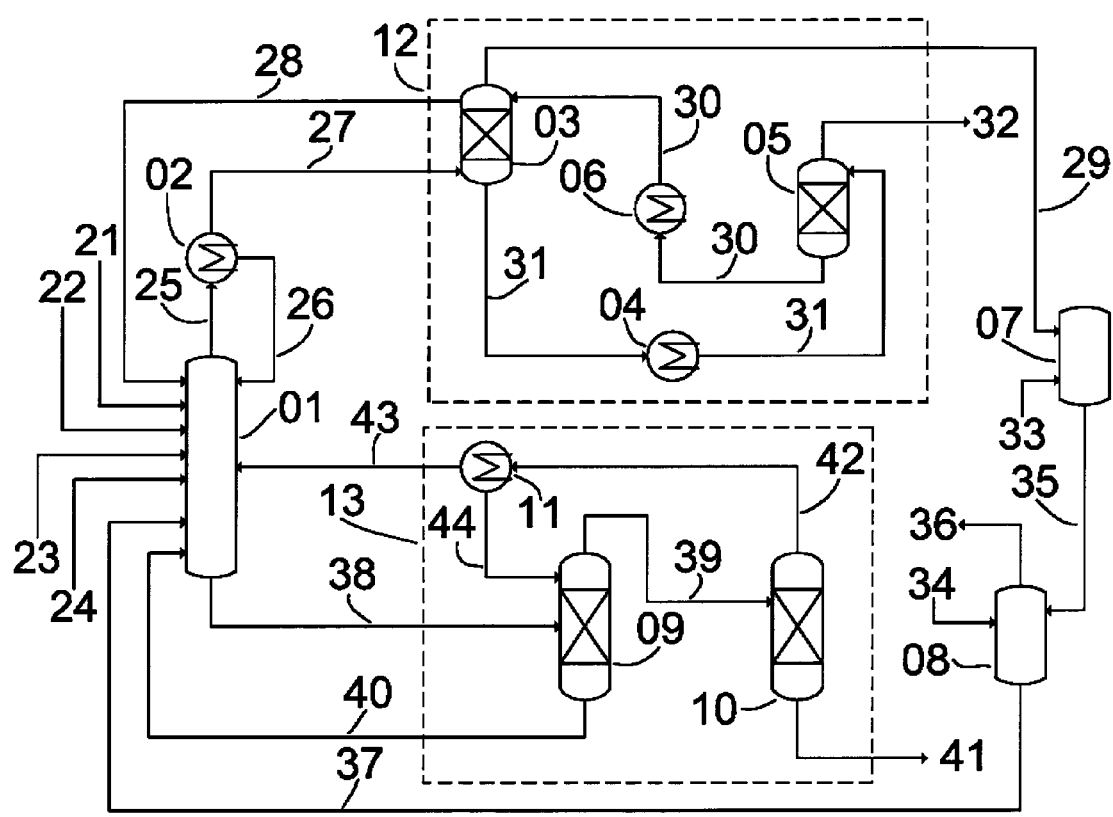
FIG. 2 illustrates a preferred mode of the process suing acetonitrile as main polar solvent.

FIG. 2 illustrates a preferred mode of the process using acetonitrile as main polar solvent. According to FIG. 1, reactor 01 is equipped with lines 21, 22, 23 and 24 to provide the feed of hydrocyanic acid, nitric acid, catalyst and organic solvent (i.e. acetonitrile), respectively. Nitric acid, organic solvent (i.e. acetonitrile) and catalyst are also fed through recycle lines 37, 40 and 43, respectively. Lines 22, 23 and 24 may also be used for make-up purposes during the process, while line 21 is also used to provide the required hydrocyanic acid during the reaction. Lines 33 and 34 respectively provide elemental oxygen and water to re-oxidize nitric oxide.

The product gas stream from reactor 01, comprising ethanedinitrile, nitric oxide, organic solvent (i.e. acetonitrile), water and traces of carbon dioxide is fed in line 25 to a condenser 02. The condensate, comprising organic solvent (i.e. acetonitrile) and water, optionally after partially or completely removal of water, is recycled through line 26 to the reactor 01. The gaseous effluent obtained in line 27 from condenser 02, comprising ethanedinitrile and nitric oxide, accompanied with small amounts of inert gases such as carbon dioxide, and only little amounts of organic solvent (i.e. acetonitrile) and water is charged in line 27 to the bottom of an absorber column 03 in countercurrent to a stream of organic solvent (i.e. acetonitrile), which is recycled in line 30 to the column head of column 03. The absorber column 03, operating at a temperature of about −5 to +30° C., preferably in a range from 0 to +15° C., may be a packed column, packed with regular or irregular packing, or a plate, bubble or bubble tray column. The mixture of line 28, comprising acetonitrile and traces of water, is removed from column 03 through an outlet pipe, mounted on the side of the column head of the column, and is recharged to reactor 01. Recycling line 28 to reactor 01 prevents the accumulation of water and organic solvent (i.e. acetonitrile) in column 03 in the absorbing/desorbing train during continuous operation.

The bottom product of column 03, comprising organic solvent (i.e. acetonitrile), ethanedinitrile and water, is discharged in line 31, is fed to a heater 04 and subsequently is recycled to the head of a desorber column 05. The overhead stream of column 03, comprising nitric oxide with traces of inert gases such as carbon dioxide, advantageously is fed in line 29 to an oxidation reactor 07 to obtain nitric acid as outlined below.

Separating acetonitrile from impurities and other compounds which are detrimental to the process (i.e. water) is carried out according to the state of the art known to the skilled person, for example using low pressure and/or elevated temperature, within the desorber column 05. Advantageously, column 05 is configured as a packed column, packed with regular or irregular packing, or as a plate, bubble or bubble tray column. A stream of rectified organic solvent (i.e. acetonitrile), which still may comprise water, is discharged from the bottom of column 05 and fed in line 30 to a heat exchanger 06. Subsequently, acetonitrile is heated to the operating temperature of column 03, and then is recycled to the head of column 03. The overhead stream of column 05 is discharged in line 32, comprising almost pure gaseous product ethanedinitrile, which can be directly used or may be recovered for example after cooling and condensation. It is also possible to pass a gaseous or liquefied ethanedinitrile through a base to obtain a hydrolyzed compound thereof.

As outlined in FIG. 1 above, nitric oxide recovered in column 03 from the gaseous product streams of line 25, is re-oxidized to nitric acid and recharged as nitric acid in line 37 to the reactor 01 to reduce the amount of oxidation reagent required to run the process.

In line 38 a partial amount of the reaction mixture, either in continuous or discontinuous mode, said reaction mixture comprising organic solvent (i.e. acetonitrile), water, catalyst, dissolved ethanedinitrile and small amounts unreacted nitric acid and hydrocyanic acid, is discharged from reactor 01, and fed to a rectification column 09, operating at a pressure in the range of 0.8 to 20 bar, preferably in the range of 0.8 to 8 bar, particularly preferred in the range of 4 to 6 bar. In column 09 the product gas stream is separated into (i) an overhead stream, comprising an almost azeotropic composition of organic solvent (i.e. acetonitrile), water and traces of ethanedinitrile and hydrocyanic acid, which is fed in line 39 to column distillation column 10, and (ii) a bottom product, comprising organic solvent (i.e. acetonitrile), catalyst, nitric acid and traces of water, which is recycled in line 40 to reactor 01. The distillation column 10 is working at low pressure of about 0.05 to 1 bar, preferably in the range of 0.1 to 0.5 bar. Within column 10, the mixture of line 39, which is the column head stream of column 09, is separated into (i) an overhead stream and (ii) a bottom product. The overhead stream (i) is fed in line 42 to a condenser 11, while the bottom product (ii) predominantly consisting of water is discharged in line 41 from the process. While operating in continuous mode, the water discharged in line 41, approximately corresponds to the molar amount of water obtained in reactor 01 if the overall amount of water is controlled at a constant level. Within condenser 11, the over stream fed by line 42 is separated into (i) a condensed liquid fraction, comprising an almost azeotropic mixture of the organic solvent (i.e. acetonitrile) and water, which is recycled in line 44 to the head of column 09, and (ii) a gaseous stream, comprising ethanedinitrile, hydrocyanic acid, and organic solvent (i.e. acetonitrile), which in line 43 is recycled to reactor 01.

LISTING OF EMBODIMENTS OF FIGS. 1 AND 2

01: Reactor
02: Heat exchanger (Condenser)
03: Absorber column
04: Heat exchanger
05: Desorber column
06: Heat exchanger
07: Reactor
08: Reactor
09: Rectification column
10: Distillation column
11: Heat exchanger
12: Work-up unit for product recovery form nitrogen oxide
13: Solvent recovery unit
21: Hydrocyanic acid feed
22: Nitric acid feed
23: Catalyst acid feed
24: Solvent feed
25: Gaseous product stream from reactor
26: Product-depleted solvent stream
27: Solvent-depleted product gas stream
28: Purge stream (Condensed water- and product-depleted solvent stream)
29: Gaseous stream comprising nitric oxide and inert gases
30: Washing solvent for recovering ethanedinitrile
31: Solvent with ethanedinitrile and water
32: Ethanedinitril product gas stream
33: Oxygen comprising gas
34: Water feed
35: Nitrogen dioxide gas stream
36: Exhaust gas stream
37: Recycled nitric acid
38: Partial amount of reaction mixture
39: solvent and water stream
40: Recycle loop for recovered catalyst
41: Water removed from the process
42: Overhead stream
43: Bypass stream of solvent, ethanedinitrile and hydrocyanic acid
44: Condensed liquid fraction of mixture of solvent and water

EXAMPLES

Only in the examples for the purpose to easily determine the yield of ethanedinitrile the effluent product gas was passed through a basic stripper (KOH solution) which almost completely absorbs ethanedinitrile in contrast to that NO and $N_2$ which remain in the gaseous form. As shown in the examples the present process avoids the development of nitrogen dioxide and other higher oxidized nitrogen compounds, summarized as $N_xO_y$, wherein y is 2x.

Example 1

Copper(II) nitrate trihydrate (95 wt %, 10.5 g, 42 mmol) in acetonitrile (694 mL) was placed in a 2 L vessel (Labmax, Mettler) under nitrogen and heated to 70° C. Within 2 h, hydrocyanic acid (HCN, 100%, 63.1 g) and nitric acid (65 wt %, 84.5 g) was fed simultaneously to at that temperature. After complete addition the mixture was stirred for additional 30 min. A colorless gas, indicating the absence of $NO_2$, evolved from the mixture upon addition of HCN. According to gas chromatographic analysis the effluent gas product had the following composition: Ethanedinitrile ($(CN)_2$): 64.9%, NO and $N_2$: 32.5%, $CO_2$: 2.6%, HCN: 0%, $H_2O$: 0% and acetonitrile (solvent peak)

Acetonitrile was stripped off the gaseous mixture in a cooler, which was temperature adjusted at −15° C. Subsequently the remaining gaseous mixture was passed through an aqueous KOH solution (10 wt %). The absorbed $(CN)_2$ was determined to be 54 g, corresponding to a yield of 85%.

Example 2

Copper(II) nitrate trihydrate (95 wt %, 7 g, 30 mmol) in acetonitrile (902 mL) was placed in a 2 L vessel (Labmax, Mettler) under nitrogen and heated to 70° C. Within 2.5 h, HCN (81.6 g) and nitric acid (65 wt %, 102.6 g) was fed simultaneously to the mixture at that temperature. After complete addition the mixture was stirred for additional 60 min. A colorless gas, indicating the absence of $NO_2$, evolved from the mixture upon addition of HCN. According to gas chromatographic analysis the effluent gas product had the following composition: $(CN)_2$: 65.6%, NO and $N_2$: 31.7%, $CO_2$: 2.8%, HCN: 0%, $H_2O$: 0% and acetonitrile (solvent peak). Acetonitrile was stripped off the gaseous mixture in a cooler, which was temperature adjusted at −15° C. Subsequently the remaining gaseous mixture was passed through an aqueous KOH solution (10 wt %), $(CN)_2$ and $CO_2$ was almost completely absorbed. The absorbed $(CN)_2$ was determined to be 65 g, corresponding to a yield of 80%.

Example 3

Copper(II) nitrate trihydrate (95 wt %, 10.0 g, 40 mmol) in acetonitrile (660 mL) and $H_2O$ (63.0 mL) was placed in a 2 L vessel (Labmax, Mettler) under nitrogen and heated to 70° C. Within 4.5 h, HCN (100%, 149.8 g), and nitric acid (65 wt %, 194 g) was fed simultaneously to the mixture at that temperature. After complete addition the mixture was stirred for additional 60 min. A colorless gas, indicating the absence of $NO_2$, evolved from the mixture upon addition of HCN. According to gas chromatographic analysis the effluent gas had the following composition: $(CN)_2$: 69.3%, NO and $N_2$: 28.5%, $CO_2$: 0.5%, HCN: 1.3%, $H_2O$: 0% and acetonitrile (solvent peak). Acetonitrile was stripped off the gaseous mixture in a cooler, which was temperature adjusted at −15° C. Subsequently the remaining gaseous mixture was passed through an aqueous KOH solution (10 wt %), wherein $(CN)_2$ and $CO_2$ was absorbed. The absorbed $(CN)_2$ was determined to be 116 g, corresponding to a yield of 78%.

Example 4

Copper(II) nitrate trihydrate (95 wt %, 10.0 g, 40 mmol) in sulfolane (356 mL) was placed in a 2 L vessel (Labmax, Mettler) under nitrogen and heated to 70° C. Within 3 h, HCN (100%, 99.7 g), and nitric acid (65 wt %, 129.6 g) was fed simultaneously to the mixture at that temperature. After complete addition the mixture was stirred for additional 30 min. A colorless gas, indicating the absence of $NO_2$, evolved from the mixture upon addition of HCN. According to gas chromatographic analysis the effluent gas product had the following composition: $(CN)_2$: 46.1%, $NO+N_2$: 42.0%, $CO_2$: 10.7%, HCN: 0.3%, $H_2O$: 0.3%. The gaseous mixture was passed through an aqueous KOH solution (10 wt %), wherein $(CN)_2$ and $CO_2$ was absorbed. The absorbed ethanedinitrile was determined to be 72 g, corresponding to a yield of 54%.

Example 5

In a 2 L vessel (Labmax, Mettler), a mixture of copper(II) nitrate trihydrate (95 wt %, 10.0 g, 40 mmol), acetonitrile (600 mL) and water (63 mL) is prepared under nitrogen and heated to 70° C. Within 3 h hydrocyanic acid (100 wt, 0.54 g/min) and nitric acid (65 wt %, 0.72 g/min) are fed simultaneously to the mixture and subsequently stirred for additional 30 min at that temperature. During the whole reaction time an amount is continuously discharged from the reaction mixture and also continuously replaced with a mixture of copper(II) nitrate trihydrate (10.0 g) in acetonitrile (600 mL). Both, discharging and charging is carried out at a fed rate of 1.5 g/min. The gas stream immediately approaching from the mixture upon addition of HCN was colorless. A colorless gas, indicating the absence of $NO_2$, evolved from the mixture upon addition of HCN. According to gas chromatographic analysis the effluent gas product had the following composition during the whole reaction time: $(CN)_2$: 70.6 to 71.4%, $NO+N_2$: 27.9 to 29.9%, $CO_2$: 0.3 to 0.8%, HCN: 0 to 0.5%, $H_2O$: 0 to 0.1%. The gaseous product stream was passed through a cooler maintained at −15° C. to remove acetonitrile. Finally, $(CN)_2$ (79 g) was obtained in a yield of 80%.

Comparison Example 1

According to example 2 run 4 of U.S. Pat. No. 3,949,061 an aqueous copper(II) nitrate solution (500 mL, comprising 190.5 g copper(II) nitrate, 750 mmol) was placed in a 2 L vessel (Labmax, Mettler) under nitrogen and the pH was adjusted to about pH 0 with 65 wt % nitric acid (79 g). Within 30 min HCN (100%, 41.5 g) was fed at 20° C. under stirring. A brown gas, indicating the presence of $NO_2$, evolved from the mixture upon addition of HCN. The mixture was heated to 30° C. within 30 min and constantly stirred for additional 30 min. Subsequently additional HCN (15.5 g) was fed at 30° C. The mixture was stirred for additional 30 min at 30° C. Starting with first HCN dosage oxygen was fed through a frit to the mixture at 0.23 mol/h for 15 min, than reduced to 0.12 mol/h, which was continued until the reaction was stopped. Gas chromatographic analysis of the exhaust gas revealed a decreasing $(CN)_2$ content from 22.3% to 4.5% in the course of reaction. Due to the low yield and even decreasing content of $(CN)_2$ in the exhaust gas the reaction temperature was raised from 20° C. to 30° C. and parallel dosage of HCN and $O_2$ continued for additional 3 h. Nevertheless, $(CN)_2$ dropped to 4.6%, NO, $N_xO_y$, wherein y is 2x, and $N_2$ increased to 74%, while HCN increased to about 20%. During the reaction the clear blue solution turned into a greenish suspension under appearance of white fall-out. The white fall-out was determined to be insoluble CuCN and of oxamide (NC—C(O) $NH_2$), the latter as the product of hydrolyzed $(CN)_2$. Final yield of $(CN)_2$: 13%.

Comparison Example 2

In a 2 L vessel, according to U.S. Pat. No. 3,997,653, (Labmax, Mettler) a mixture of 10.5 g copper(II) nitrate trihydrate (95 wt %, 10.5 g, 42 mmol) was placed with acetonitrile (693 mL) and heated to 70° C. With a feed rate of 0.54 mol/h (0.35 mL/min) HCN was added. A brown gas, indicating the presence of $NO_2$, evolved from the mixture upon addition of HCN. Starting with first HCN dosage oxygen was fed through a fit to the mixture at 0.34 mol/h (60 mL/min) for a period of 3 h. In the course of the reaction the blue solution turned into a greenish suspension and a white precipitate appeared. Gas chromatographic analysis of the exhaust gas revealed a decreasing $(CN)_2$ content from 35 to 27%. NO, $N_xO_y$, wherein y is 2x, and $N_2$ remained at about 56%, the $CO_2$ content from 7.6 to 0%, while the HCN content increased from 0 to 14%. Final yield of $(CN)_2$: 38%.

The invention claimed is:

1. A process for the preparation of ethanedinitrile in liquid phase by catalytic oxidation of a reaction mixture of hydrocyanic acid in the presence of a cupric ion catalyst and an aprotic polar solvent, characterized in that nitric acid is added as the sole oxidant to the reaction mixture.

2. The process of claim 1, characterized in that nitric acid and hydrocyanic acid are added simultaneously with a molar ratio in the range from 1:2.5 to 1:3.5.

3. The process of claim 1, characterized in that water is present in the reaction mixture in an amount of up to 20 wt % of the liquid phase.

4. The process of claim 1, characterized in that the aprotic polar solvent is selected from organic nitriles, ethers, glycol derivatives, organic nitro compounds, sulfones, esters, amides, thioamides or polar aromatic heterocycles.

5. The process of claim 1, wherein the cupric ion catalyst is selected from the group consisting of a copper(0) metal, a copper(0) alloy, a copper(0) complex, a copper (I) salt, a copper(I) complex, a copper(II) salt, a copper(II) complex, and mixtures thereof.

6. The process of any of claim 1, wherein hydrocyanic acid and nitric acid are fed simultaneously to the reaction mixture.

7. The process of claim 1, wherein the process is conducted in a reactor and a product gas stream comprising ethanedinitrile and nitric oxide is continuously removed from the reactor and subjected to further work-up, and the ethanedinitrile is separated from the product gas stream.

8. The process of claim 7, wherein the ethanedinitrile of the product gas stream is absorbed in a solvent and recovered from said solvent.

9. The process of claim 7, wherein the nitric oxide of the product gas stream is fed to a separate reactor and then oxidized with an oxygen containing gas to obtain nitrogen dioxide, wherein said nitrogen dioxide is absorbed in water to obtain nitric acid, said nitric acid is recycled to the catalytic oxidation of a reaction mixture of hydrocyanic acid in the presence of a cupric ion catalyst and an aprotic polar solvent, and said nitric acid is added as sole oxidant to the reaction mixture.

10. The process of claim 1, wherein the process is carried out as a continuous process.

11. The process of claim 10, wherein said continuous process is conducted in a reactor, and a product gas stream comprising ethanedinitrile and nitric oxide is continuously removed from the reactor and subjected to further work-up, wherein in said work-up the ethanedinitrile is separated from the product stream by absorption of the ethanedinitrile in a solvent and recovered from said solvent, wherein said solvent used for said separation is the same as the solvent used in said catalytic oxidation of a reaction mixture of hydrocyanic acid in the presence of a cupric ion catalyst and an aprotic polar solvent, characterized in that nitric acid is added as the sole oxidant to the reaction mixture.

12. The process of claim 11, wherein the organic solvent is acetonitrile.

13. The process of claim 1, wherein the process is conducted in a reactor and the reaction of nitric oxide with hydrocyanic acid is carried out in acetonitrile to produce a product gas stream comprising ethanedinitrile and nitric oxide and the nitric oxide of said product gas stream is fed countercurrent to acetonitrile in an absorber column, said countercurrent acetonitrile predominantly absorbs ethanedinitrile while nitric oxide remains in gaseous form, and wherein finally the product ethanedinitrile is recovered from acetonitrile and removed from the process, while acetonitrile is recovered and recycled to the process.

14. The process of claim 13, wherein the product ethanedinitrile is recovered from acetonitrile in a desorber column.

15. The process of claim 13, wherein nitric oxide is recovered from said absorber column is oxidized in the presence of an oxygen containing gas to obtain nitrogen dioxide, which is reacted with water to obtain nitric acid, wherein said nitric acid is recycled to said catalytic oxidation of a reaction mixture of hydrocyanic acid in the presence of a cupric ion catalyst and an aprotic solvent, characterized in that nitric acid is added as the sole oxidant to the reaction mixture.

* * * * *